United States Patent [19]

Tojo

[11] Patent Number: 5,452,155
[45] Date of Patent: Sep. 19, 1995

[54] TAPE CASSETTE LOADING APPARATUS HAVING TAPE SLACK TAKE-UP MECHANISM

[75] Inventor: Shuichi Tojo, Yokohama, Japan

[73] Assignee: Victor Company of Japan, Ltd., Yokohama, Japan

[21] Appl. No.: 357,539

[22] Filed: Dec. 16, 1994

Related U.S. Application Data

[63] Continuation of Ser. No. 889,525, May 27, 1992, abandoned.

[30] Foreign Application Priority Data

May 31, 1991 [JP]  Japan ................... 3-155372

[51] Int. Cl.[6] ............... G11B 15/675; G11B 15/43
[52] U.S. Cl. ................... 360/96.5; 242/338
[58] Field of Search ............ 360/96.5, 96.6, 96.3, 360/96.1, 94, 74.3, 71; 242/338, 340, 342

[56] References Cited

U.S. PATENT DOCUMENTS

| | | | |
|---|---|---|---|
| 4,432,510 | 2/1984 | Ogata et al. | 242/200 |
| 4,494,161 | 1/1985 | Ogata et al. | 360/94 |
| 4,567,536 | 1/1986 | Tsuchiya | 360/94 |
| 5,140,475 | 8/1992 | Tanaka | 360/96.3 |
| 5,150,265 | 9/1992 | Tanaka | 360/96.3 |

FOREIGN PATENT DOCUMENTS

| | | | |
|---|---|---|---|
| 2013052 | 3/1970 | France . | |
| 2352369 | 12/1977 | France . | |
| 0234252 | 9/1987 | France . | |
| 63-193370 | 8/1988 | Japan | 360/96.6 |
| 3-230351 | 10/1991 | Japan | 360/96.6 |
| 2104872 | 3/1983 | United Kingdom . | |
| 2237678 | 5/1991 | United Kingdom | 360/74.3 |

*Primary Examiner*—Stuart S. Levy
*Assistant Examiner*—Craig A. Renner
*Attorney, Agent, or Firm*—Michael N. Meller

[57] ABSTRACT

A tape cassette loading system is provided in a magnetic recording and/or reproducing apparatus for loading a tape cassette into the apparatus. The tape cassette generally comprises a cassette case having a front lid, a pair of tape reels accommodating a magnetic tape thereon within the cassette case and a window at a side wall of the cassette case to expose a reel flange of the tape reels, which reel flange is engageable with a reel driving system of the apparatus. The tape cassette loading system includes a cassette holder having a frame body into which the tape cassette is loaded, and a tape slack take-up mechanism provided on the cassette holder at a position corresponding to the window of the cassette case. Thus, any tape slack of the magnetic tape developed in the cassette case, is taken-up by the tape slack take-up mechanism upon loading the tape cassette into the cassette holder.

6 Claims, 6 Drawing Sheets

TAPE CASSETTE LOADING APPARATUS HAVING TAPE SLACK TAKE-UP MECHANISM

This application is a continuation of application Ser. No. 07/889,525, filed May 27, 1992, now abandoned.

BACKGROUND OF THE INVENTION

1. Field of the Invention

The present invention relates to improvements of a tape cassette loading system equipped in a magnetic recording and/or reproducing apparatus, for loading a tape cassette accommodating a magnetic tape wound around a pair of tape reels, and it particularly relates to a tape cassette loading system having a tape slack take-up mechanism capable of taking-up a tape slack of the magnetic tape occurring in the tape cassette by rotating at least one of the tape reels within the tape cassette, when the tape cassette is loaded in the cassette loading system equipped in the apparatus.

2. Description of the Related Art

Presently, such a magnetic recording and/or reproducing apparatus as having rotary magnetic heads, for instance, a Video Tape Recorder (VTR) or a Rotary head Digital Audio Tape recorder (R-DAT) is widely used together with a magnetic tape cassette (referred to as a "tape cassette" or a "cassette" hereafter) accommodating a magnetic tape wound around a pair of tape reels.

Upon a recording or a reproducing operation, the tape cassette is first loaded in a cassette loading device of the apparatus, then is automatically transferred to a predetermined set position by a transferring operation of the cassette loading device by a cassette transfer mechanism, while a front lid of the tape cassette is rotated upward to open by a lid opening mechanism. A segment of the magnetic tape being between the pair of tape reels is positioned just behind the front lid with its closed position. Thus, upon the tape loading, a pair of loading poles enters into a mouth provided at a bottom of the cassette to intercept and engage with the tape segment to draw it out of the cassette with its lid being open, subsequently, the loading poles move respectively to predetermined positions so as to bring the magnetic tape obliquely around a rotary head drum in a predetermined range. Then, recording or reproducing of signals on or from the magnetic tape is performed by rotary magnetic heads fixed to the rotary head drum.

When a user manually rotates a tape reel or reels for some reason before loading the cassette into a recorder or when the cassette 100 is shaken violently, the tape segment just behind the front lid is liable to be slackened and often a tape slack within the cassette as illustrated in FIG. 1 develops. FIG. 1 is a plan view showing a tape cassette in which a magnetic tape has a tape slack. Referring to FIG. 1, a magnetic tape 101 is accommodated in the cassette 100 in such a manner that both ends of the magnetic tape 101 are respectively wound around and anchorred to a pair of tape reels, a supply reel 102 and a take-up reel 103. The tape segment 101a between the tape reels 102, 103 contacts guide rollers 104, 106 disposed behind a lid 105 which can be rotated upwards to open.

Usually, a tape reel brake mechanism (not shown) utilizing friction or the like is used in the cassette 100 to prevent the tape segment 101a from unintended rotation of the reels and developing tape slacks in order not to disturb the insertion of the loading poles upon the tape loading.

However, when at least one of the tape reels 102, 103 is rotated in a tape slacking direction by an erroneous handling against the friction provided by the tape reel brake mechanism, a tape slack develops at the tape segment 101a. It should be noted that the tape slack often poses problems to the recorder, and/or the tape not only disturbing the engagement of the loading poles with the tape segment 101a, but also may cause the serious problem of the tape being jammed inside the recorder causing a tape or recorder damage or both.

SUMMERY OF THE INVENTION

A general object of the present invention is to provide a novel and useful tape cassette loading system in which the above problems have been eliminated.

A more specific object of the present invention is to provide a tape cassette loading system having a tape slack take-up mechanism in a magnetic recording and/or reproducing apparatus in order to remove a tape slack developing in the tape cassette upon loading the tape cassette. Another and more specific object of the present invention is to provide a tape cassette loading system equipped in a magnetic recording and/or reproducing apparatus for loading a tape cassette into the apparatus. The tape cassette used in the present invention generally comprises a cassette case having a front lid at a front thereof, a pair of tape reels accommodating a magnetic tape thereon within the cassette case and a window formed on a side wall of the cassette case to expose at least one of the reel flanges of the tape reels so that the reel flange is engagaeble with a reel driving system of the apparatus. The tape cassette loading system according to the present invention comprises a cassette holder having a frame body, on which cassette holder the tape cassette is loaded, and a tape slack take-up mechanism provided on the cassette holder at a position corresponding to the window of the cassette case. Thus, a tape slack developed on the magnetic tape in the cassette case is taken-up or absorbed by take-up operation of the tape slack take-up mechanism upon loading the tape cassette into the cassette holder.

Other objects and further features of the present invention will be apparent from the following detailed description when read in conjunction with the accompanying drawings.

BRIEF DESCRIPTION OF THE DRAWINGS

Preferred embodiments of the present invention will be described with reference to the accompanying drawings wherein.

DETAILED DESCRIPTION OF THE PREFERRED EMBODIMENT

The description will be given to a tape cassette used in an embodiment of the present invention prior to the description of an embodiment of a tape loading system of the present invention.

Figure 1:
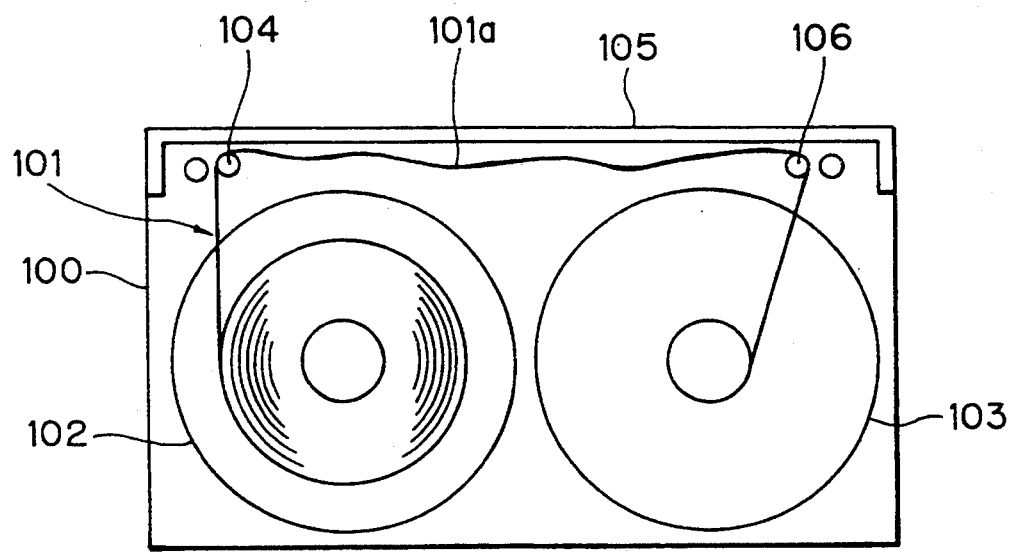
FIG. 1 is a plan view showing a generally known tape cassette in which a magnetic tape has a tape slack.
Figure 2:
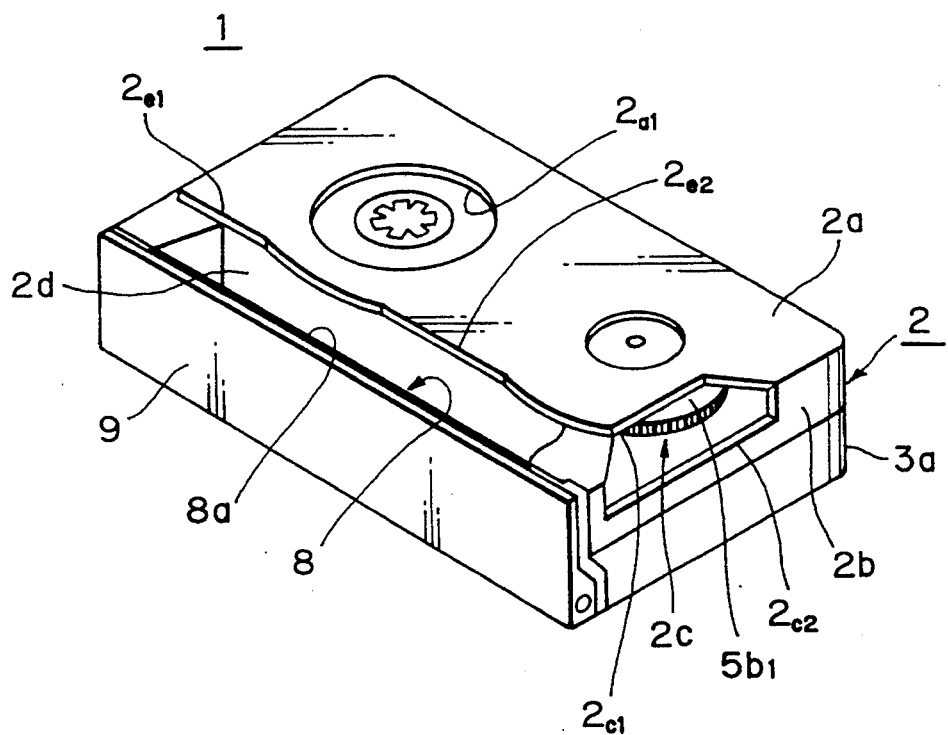
FIG. 2 is a perspective view showing a tape cassette adopted in an embodiment of the present invention from a bottom side of the tape cassette.
Figure 3:
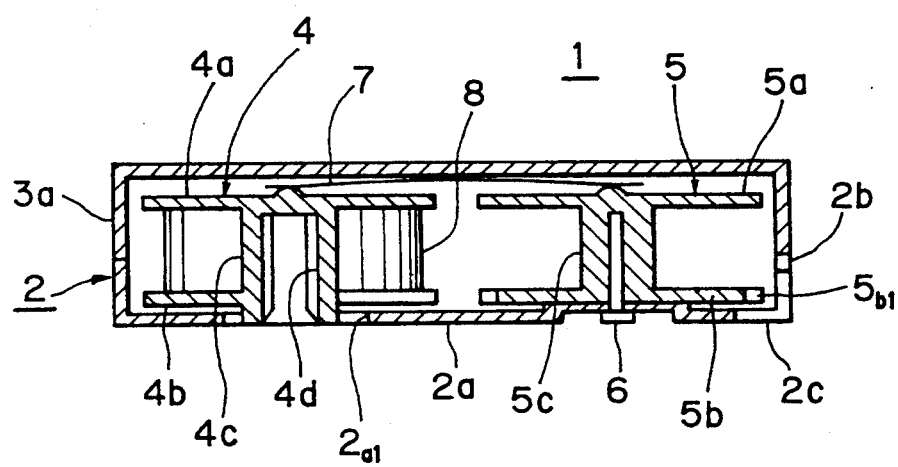
FIG. 3 is a cross-sectional view showing the tape cassette in FIG. 1., which is related to a main part of the present invention.

FIG. 2 is a perspective view showing a tape cassette adopted in an embodiment of the present invention from a bottom side of the tape cassette. FIG. 3 is a cross-sectional view showing the tape cassette in FIG. 1.

The tape cassette 1 adopted in the embodiment of the present invention comprises a cassette case 2 consisting of an upper half 3a and a lower half 2b, a front lid 9 provided at a front of the upper half 3a to cover the front part of the cassette case 2, a mouth (opening) 2d formed at the lower half 2b behind the front lid 9 for permitting an insertion of loading poles, a supply reel 4 and a take-up reel 5 for accommodating magnetic tape 8.

The following detailed description deals only with constructions of the take-up reel 5 and the supply reel 4. In this embodiment, the construction of the take-up reel 5 is different from that of the supply reel 4, however, the same construction of the supply reel 4 may be used for that of the take-up reel 5.

As illustrated in FIG. 3, the supply reel 4 comprises a pair of flanges, an upper flange 4a and a lower flange 4b, made of circular discs, and a cylindrical hub 4c interposed between the upper and lower flanges 4a, 4b which are facing each other. Further, the supply reel 4 is provided with an engaging hole 4d opened through a bottom 2a of the lower half 2b for engagement with a driving shaft of the apparatus (not shown). The supply reel 4 is movably disposed in the cassette ease 2 in a manner that the engaging hole 4d is accessible by the driving shaft through the hole 2a1 provided in the bottom 2a of the lower half 2b.

On the other hand, the take-up reel 5 comprises a pair of flanges, an upper flange 5a and a lower flange 5b, and a cylindrical hub 5c interposed between the upper and lower flanges 5a, 5b which are facing each other. The lower flange 5b of the take-up reel 5 is provided with a gear portion 5b1 at a periphery thereof for engaging with a take-up reel driving device of the apparatus (not shown). The take-up reel 5 is rotatably mounted on an axle 6 provided perpendicularly on the bottom plate 2a of the lower half 2b within the cassette case 2. Further, a slightly bent leaf spring 7 is provided across a ceiling of the upper half 3a in such manner that the distal ends of the leaf spring 7 exert small resilient forces downward on the take-up reel 5 and the supply reel 4, respectively.

As illustrated in FIG. 2, a side window 2c is formed along a side wall of the lower half 2b extending to the bottom plate 2a thereof to expose and engage the gear portion 5b1 of the take-up reel 5 with a tape slack take-up mechanism 20 of a cassette loading system 10 shown in FIG. 4, which will be described hereafter. The side window 2c is composed of 2 openings, a rectangular opening 2c2 formed on the side wall and a trapezoid opening 2c1 formed on the bottom plate 2a. It should be noted that the above gear portion 5b1 can be formed on the periphery of the upper flange 5a of the take-up reel 5 and the window 2c can be formed nearby the upper flange 5a, instead. Further, the same gear portion as the gear portion 5b1 can also be made on a periphery of either upper or lower flange 4a, 4b of the supply reel 4 and the same opening as the side window 2c nearby the gear portion.

A magnetic tape 8 is accommodated in the cassette 2 in such a manner that both ends of the magnetic tape 8 are respectively wound around and anchored to the pair of tape reels, the supply reel 4 and the take-up reel 5. A tape segment 8a between the tape reels 4, 5 is positioned along the back wall of a front lid 9 which is rotatably mounted on the front of the cassette case 2 to cover the tape segment 8a of the magnetic tape 8. In FIG. 2, 2d designates a mouth or opening to permit an insertion of tape loading poles of the apparatus (not shown).

Next, description will be given of the main part of the present invention, a cassette loading system 10, referring to FIG. 4 through FIG. 9. FIG. 4 is a perspective view showing a whole structure of a cassette loading system 10 which is the main part of the present invention. FIG. 5 is an enlarged perspective view showing a tape slack take-up mechanism 20 illustrated in FIG. 4. FIG. 6 through FIG. 9 are plan views for explaining operations of a tape slack take-up mechanism 20 to take-up a tape slack in a tape cassette.

Figure 4:
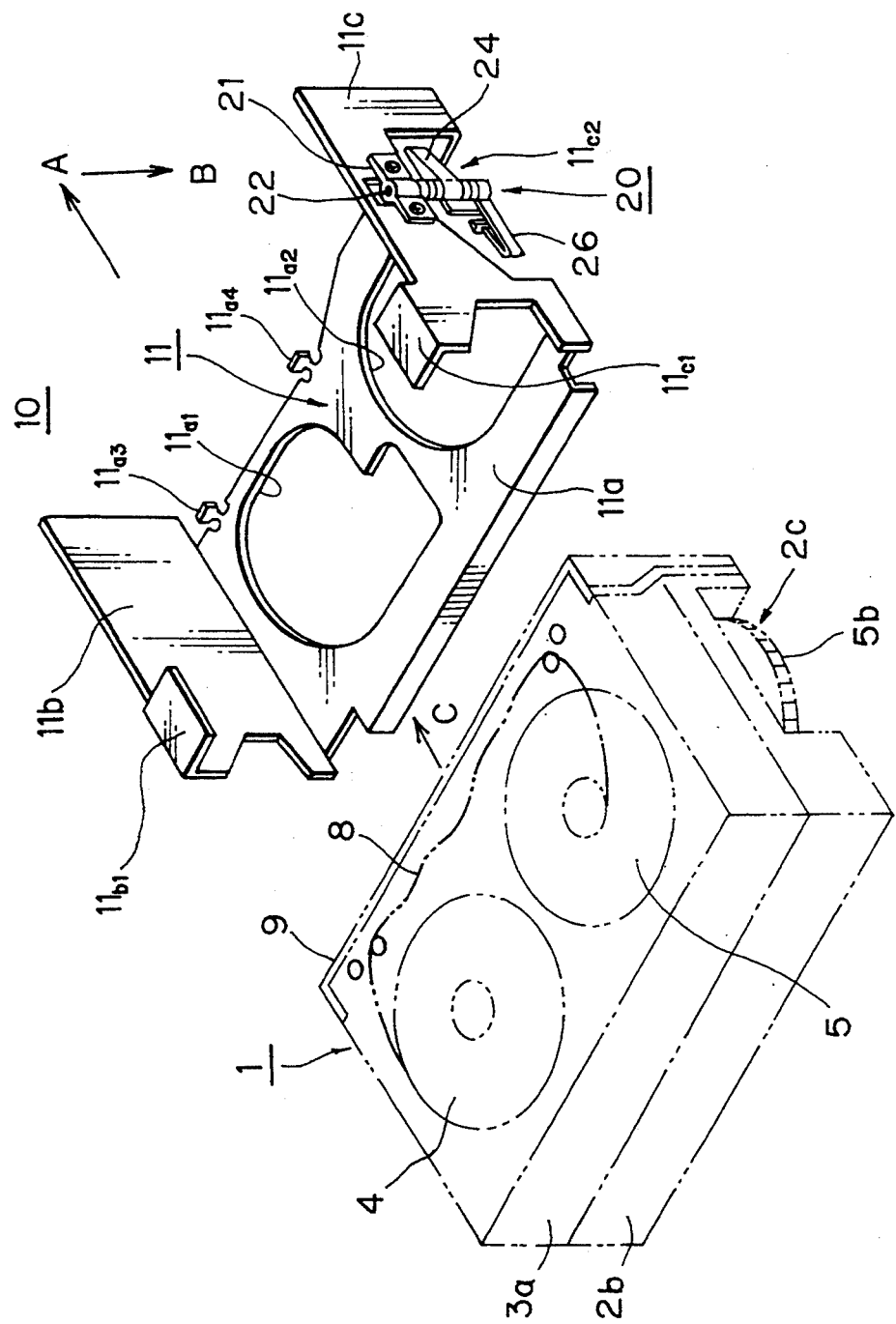
FIG. 4 is a perspective view showing a whole structure of a cassette loading system which is the main part of the present invention.
Figure 5:
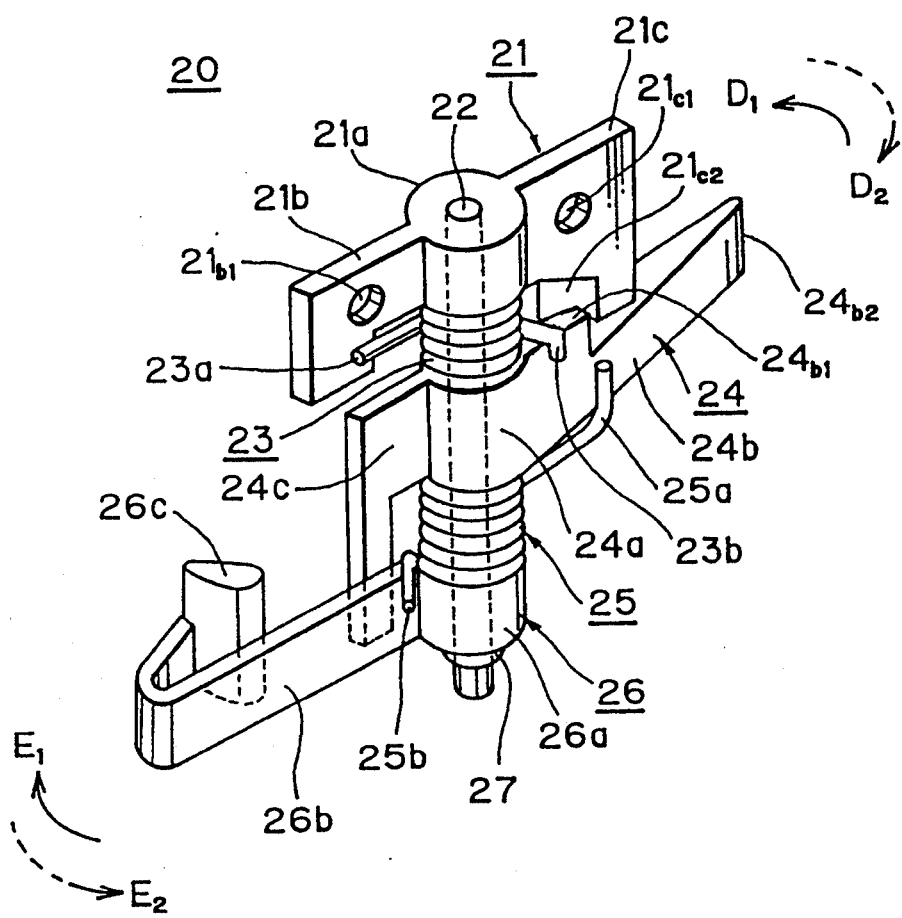
FIG. 5 is an enlarged perspective view showing a tape slack take-up mechanism illustrated in FIG. 4.

Referring to FIG. 4, an embodiment of the cassette loading system 10 according to the present invention generally comprises a cassette holder 11 made of a frame body for mounting the aforementioned tape cassette 1 (shown with two-dot chain line), and a tape slack take-up mechanism 20 rigidly provided on a right side wall 11c of the cassette holder 11, which tape slack take-up mechanism 20 has a function of taking-up a tape slack developed in the tape cassette 1. The cassette holder 11 is connected to a holder transferring mechanism (not illustrated for simplicity) which transfers the cassette holder 11 in arrow directions A then B to set the cassette holder 11 to a predetermined position.

In FIG. 4, the cassette holder 11 is made of a metal frame, and is provided with a left side wall 11b and the right side wall 11c which are bent perpendicularly upward from the both sides of a bottom plate 11a, respectively. Further, the right and left side wall 11b, 11c are respectively provided with guide parts 11b1, 11c1 which are horizontally bent in a manner that each of the distal ends of the guide parts 11b1, 11c1 opposes each other to assist a correct insertion of the tape cassette 1 into the cassette holder 11. The bottom plate 11a is provided with a large left hole 11a1 and a large right hole 11a2 so as to oppose the supply reel 4 and the take-up reel 5, respectively, for allowing engagement with a reel driving mechanism of the apparatus and with the tape slack take-up mechanism 20 when the tape cassette 1 is mounted on the cassette holder 11. Further, the bottom plate 11a is provided with stoppers 11a3, 11a4 at a rear end thereof so that the stoppers 11a3, 11a4 can engage with the contacting part 2e1, 2e2 (FIG. 2)of the cassette tape 1, a height of the stoppers 11a3, 11a4 being low enough not to obstruct the opening of the front lid 9 of the tape cassette 1 by a lid opening mechanism of the apparatus (not shown). Furthermore, the right side wall 11c is provided with a side opening 11c2 as a vertical part extended from the right large hole 11a2, where the tape slack take-up mechanism 20 is provided.

The description will be given to the tape slack take-up mechanism 20, which is pre-assembled before an installation on the cassette holder 11 as illustrated in FIG. 5. FIG. 5 is an enlarged perspective view of a tape slack take-up mechanism 20.

Referring to FIG. 5, a holding member 21 made of a resin body comprises a cylindrical member 21a, attachment plates 21b, 21c protrudingly provided on the sides of the cylindrical member 21a, respectively. One end of a long shaft 22 is press-fitted into the the cylindrical member 21a and the other end of the shaft 22 protrudes downward from the bottom of the cylindrical member 21a. The attachment plates 21a, 21b are respectively provided with screw holes 21b1 and 21c1 for attaching the tape slack take-up mechanism 20 to the right side wall 11c of the cassette holder 11 at an upper position of the side opening 11c2. Accordingly, the holding member 21 is stationary with respect to the cassette holder 11, being mounted thereon. A first coil spring 23, a detection lever 24 for detecting the tape cassette 1, a second coil spring 25 and a take-up lever 26 are mounted on the shaft 22 in order, and they are prevented from slipping off from the shaft 22 by a stopping washer 27 at the end of the shaft.

Next, the detailed description will given to the above construction members by referring to numbers 23 through 26 in order.

One end 23a of the first coil spring 23 is engaged with the attachment plate 21b and the other end 23b of the first coil spring 23 is engaged with an arm portion 24b of the detection lever 24.

The detection lever 24 integrally made of a resin body comprises a cylindrical part 24a having a hole (not shown) through which the shaft 22 is inserted, an arm portion 24b at the right side of the cylindrical part 24a and an engaging part 24c at the left side of the cylindrical part 24a. The detection lever 24 is rotatably biased in a counter-clockwise direction (arrow $D_1$) around the center of the shaft 22, by the first coil spring 23, however, a rotation of the detection lever 24 is restricted by contacting a part 24b1 of the arm portion 24b with a tapered part 21c2 of the attachment plate 21c. As seen in the description of the operation of the tape slack take-up mechanical 20 hereafter, when the tape cassette 1 is loaded into the cassette holder 11 the detection lever 24 is rotated in the clockwise direction (the arrow D2) against a biasing force of the coil spring 23 with a distal end 24b2 of the arm 24b being engaged and displaced by the tape cassette 1. Further, the engaging part 24c of the detection lever 24 protrudes downward from the cylindrical part 24a and the engaging part 24c is engaged with a back wall of a lever 26b of the tape take-up lever 26 which will be described hereafter.

One distal end 25a of the second coil spring 25 is engaged with the arm portion 24b of the detection lever 24, and the other distal end 25b of the second coil spring 25 is engaged with the lever 26b of the take-up lever 26.

The take-up lever 26 comprises a rigid cylindrical member 26a through which the shaft 22 is inserted at the center thereof and the lever 26b made of a thin plate provided at the left side of the cylindrical member 26a, which lever can elastically be displaced by an external force. The end portion of the lever 26b is bent to form a U-shaped configuration, and a distal end of the U-shaped configuration is provided with a triangular pawl 26c protruding slightly upward. The take-up lever 26 is biased in the clockwise direction (the arrow E1) by the force of the second coil spring 25 around the shaft 22, however, the rotation of the lever 26b is restricted by engaging with the engaging part 24c of the detection lever 24. As seen in the description of the operation of the tape slack take-up mechanism 20 hereafter, when the detection lever 24 is rotated in the clockwise direction (the arrow D2) upon loading of the tape cassette 1 into the cassette holder 11, the lever 26b of the take-up lever 26 is allowed to be rotated in the clockwise direction (the arrow E1) because the lever 26b of the take-up lever 26 follows the motion of the engagement part 24c of the detection lever 24 due to the biasing force of the second coil spring 25. This causes the triangular pawl 26c of the tape take-up lever 26 to engage with the gear portion 5b1 of the tape cassette 1 (FIG. 3).

Next, the description will be given to an operation of the tape loading system 10 of the present invention, in particular an operation of the tape slack take-up mechanism 20, with reference to FIG. 6 through FIG. 9.

Figure 6:
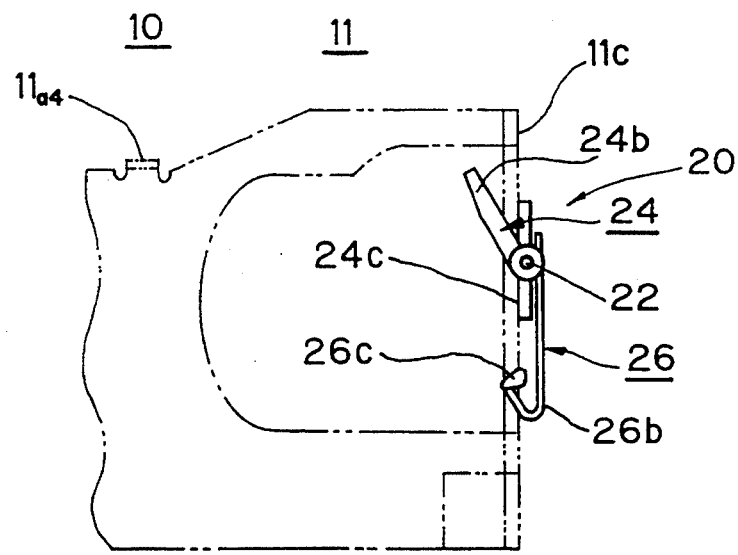
FIG. 6 through FIG. 9 are plan views for explaining operations of the tape slack take-up mechanism illustrated in FIG. 4 and 5.

As previously mentioned, the tape cassette 1 is loaded into the cassette holder 11 in the arrow direction C as illustrated in FIG. 4. FIG. 6 shows an initial state of the tape loading system 10 where the tape cassette 1 is not loaded into the cassette holder 11. In this state, the arm portion 24b of the detection lever projects into the inside of the tape holder 11 from the right side wall 11c. On the other hand, the lever 26b provided with the triangular pawl 26c is positioned nearby the right side wall 11c of the cassette holder 11.

Figure 7:
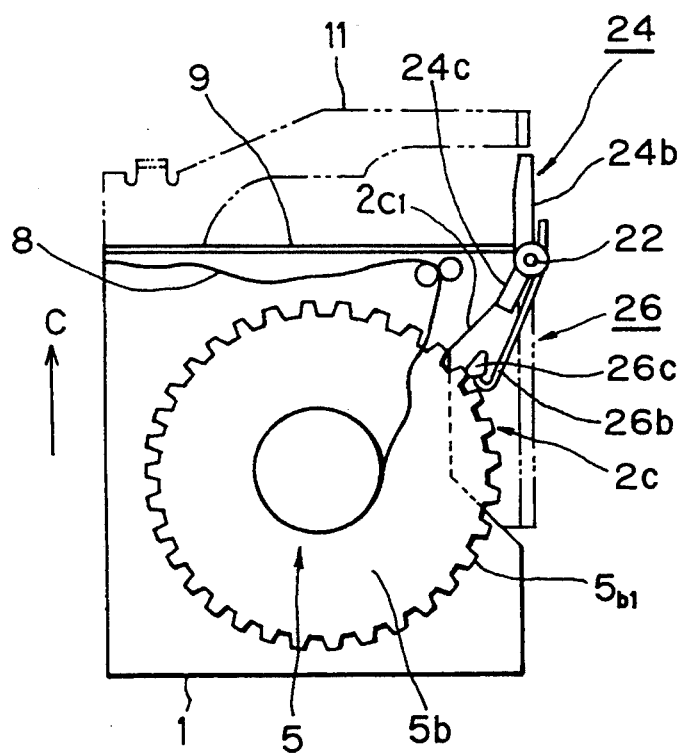

FIG. 7 shows a loading state where the tape cassette 1 is halfway loaded into the tape holder 11. The detection lever 24 is rotated in the clockwise direction around the shaft 22 against the biasing force of the first coil spring 23 by being pushed by the front lid 9 of the tape cassette 1 which is loaded halfway in the direction of the arrow C. Therefore, the engaging part 24c of the detection lever 24 is also rotated in the clockwise detection, so that the lever 26b of the take-up lever 26 is rotated in the clockwise direction by the biasing force of the second coil spring 25, following to the motion of the engaging part 24c, and the triangular pawl 26c of the take-up lever 26 is engaged with the gear portion 5b1 of the lower flange 5b of the take-up reel 5. The gear portion 5b1 resides nearby the side opening 2c2 of the tape cassette 1, in which a tape slack of the magnetic tape 8 is seen behind the front lid 9.

Figure 8:
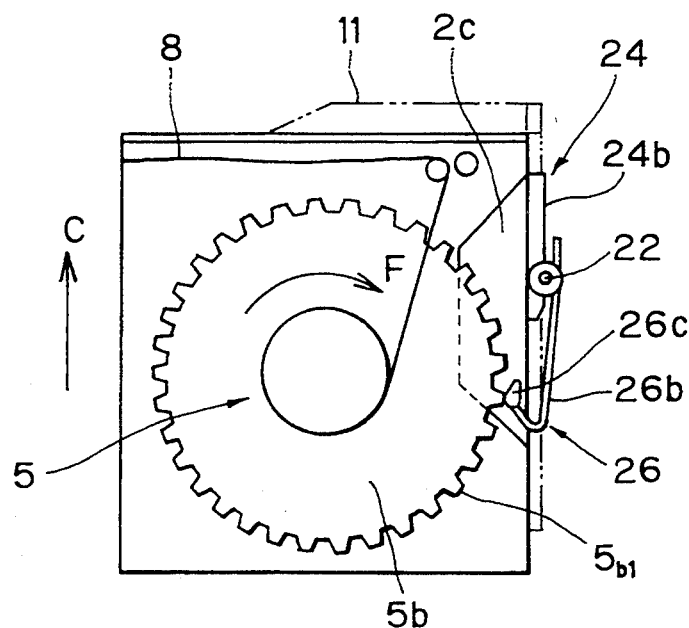

FIG. 8 shows a loading state where the tape cassette 1 is further inserted in the direction of arrow C than in FIG. 7. In this state, the take-up reel 5 is rotated in the clockwise direction (the arrow F) by the friction exerted between the triangular pawl 26c of the take-up lever 26 and the gear portion 5b1 of the lower flange 5b. Thus, the tape slack (if any) of the magnetic tape 8 is taken-up by the rotation of the take-up reel 5 and the magnetic tape 8 behind the front lid 9 is tightened to be straight. In the above embodiment of the present invention, the tape cassette 1 has the gear portion 5b1 at the periphery of the lower flange 5b to engage with a driving mechanism (not shown) of the apparatus, so that a larger friction occurs between the pawl 26c and gear portion 5b1 because of such a jagged structure of the gear portion 5b1. However, it should be noted that it is not always necessary to provide the gear portion 5b1 on the take-up reel 5 for generating the friction between the pawl 26c and the periphery of the take-up reel 5, other contacting methods are also possible.

Figure 9:
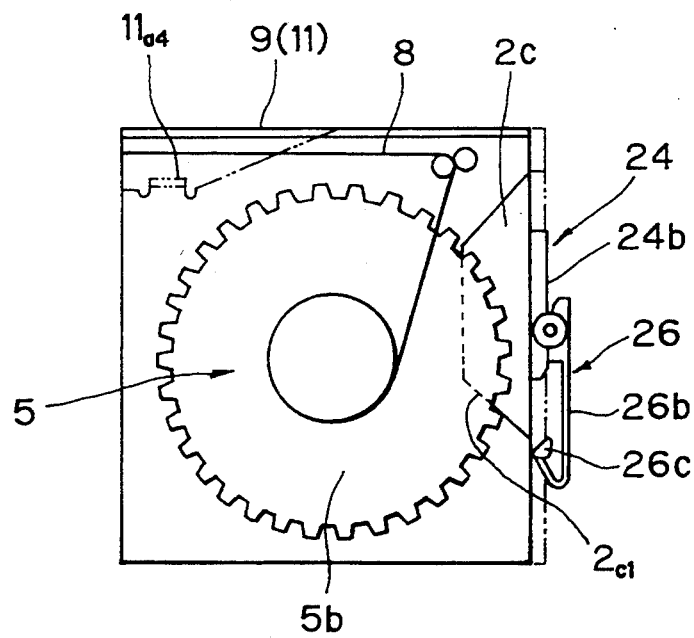

FIG. 9 shows a loading state where the tape cassette 1 is completely loaded into the cassette holder 11. In this state, the tape cassette 1 is restricted by the stoppers 11a3, 11a4, and the pawl 26c is disengaged from the gear portion 5b1 and retracted to the right side wall 11c of the cassette holder 11. This occurs as such that the pawl 26c which slides on an edge of the trapezoid opening 22c1, is displaced back to the right side wall 11c (in the direction of arrow $E_2$ of FIG. 5) as the tape cassette 1 travels toward the fully loaded position shown in FIG. 9. As a result, the tape slack of the magnetic tape 8 is thoroughly taken-up by the take-up reel 5.

In case of a tape cassette having a built-in tape brake mechanism (not shown) which prevents a take-up reel and a supply reel from free rotation, such tape cassette does not pose a problem when loaded in the cassette loading system 10, as the lever 26b of the take-up is elastic and is simply displaced by the gear portion 5b1 of the lower flange 5b which is prevented from rotation by the brake mechanism. The same is true when a tape cassette 1 having no tape slack developed within, is loaded.

This suggests a modification of the present invention in which the pawl 26c is preloaded by its elasticity to contact the periphery of the lower flange of the take-up reel without providing the detecting lever 24. In this modification, the take-up lever 26 serves the same function as that of the tape take-up mechanism 20, accordingly, a leaf spring may be substituted for the take-up lever 26.

Further, as another modification of the present invention, the pawl 26c of the take-up lever 26 may be engaged with the periphery of the upper flange 5a instead of that of the lower flange 5b.

Furthermore, as a further modification of the present invention, a tape slack take-up mechanism of asymmetrical design with respect to the tape slack take-up mechanism 20 may be provided to the left side wall 1b to cause the supply reel 4 to take-up the tape slack by rotating it counter-clockwise.

According to the tape loading system of the present invention, as mentioned in the foregoing description, the tape slack developed within a tape cassette prior to loading the cassette, can be taken-up by an operation of the tape slack take-up mechanism upon loading of the tape cassette, so that subsequent operations, such as the tape loading operation mentioned of the prior art can be securely performed.

Thus, the present invention permits the realization of a reliable magnetic recording and/or reproducing apparatus without causing damage to the magnetic tape accommodated in the tape cassette.

It is further understood by those skilled in the art that the foregoing description is a preferred embodiment of the disclosed device and that various changes and modifications may be made in the invention without departing from the spirit and scope thereof.

What is claimed is:

1. A tape cassette loading system provided in a magnetic recording and/or reproducing apparatus, adapted for loading a tape cassette into the apparatus, which tape cassette comprises a cassette case having a front lid, a pair of tape reels having reel flanges and accommodating a magnetic tape thereon within the cassette case and a window formed at a side wall of the cassette case to expose-at least one reel flange of the tape reels, said tape cassette loading system comprising:

a cassette holder having a frame body and a side wall, said tape cassette being loaded into the cassette holder; and tape slack take-up means provided on said cassette holder for taking-up a tape slack of the magnetic tape developed in the cassette case, said tape slack take-up means comprising engaging means (for engaging with said one reel flange through said window of the cassette case and cassette detection means for detecting loading of the tape cassette into said cassette holder and for displacing said engaging means to an engaging position from a retracted position so as to engage with said one reel flange in cooperation with loading of the tape cassette into the cassette holder, said engaging means comprising a lever and a pawl provided at a distal end of the lever, said lever of said engaging means made of an elastic material so as to permit an elastic displacement of said lever in a direction away from said one reel flange by an external force exerted between said one reel flange and said engaging means, wherein the tape slack of the magnetic tape is taken-up in a manner that said engaging means engages with and rotates the tape reel having said one reel flange in cooperation with a loading of the tape cassette into said cassette holder.

2. A tape cassette loading system as claimed in claim 1, wherein said lever of said tape slack take-up means has a U-shaped configuration and said pawl is provided on a distal end of the U-shaped configuration.

3. A tape cassette loading system as claimed in claim 1, wherein said detection means comprises a cylindrical part, a detection lever provided at a side of the cylindrical part and an engaging part protrudingly provided at another side of the cylindrical part.

4. A tape cassette loading system as claimed in claim 1, wherein said tape slack take-up means further comprises a holding member attached to said side wall of said cassette holder and a shaft fixed to said holding member and said engaging means being rotatably provided on the shaft.

5. A tape cassette loading system as claimed in claim 1, wherein said one reel flange has gear means exposed through said window to allow said one reel flange to be driven and to engage with said engaging means of said tape slack take-up means.

6. A tape cassette loading system as claimed in claim 1, wherein said tape slack taking-up means is disposed in a side opening provided on said cassette holder.

* * * * *